United States Patent [19]

Hepworth

[11] Patent Number: 5,288,189

[45] Date of Patent: Feb. 22, 1994

[54] FIXING DEVICE FOR A CAVITY WALL

[75] Inventor: Paul S. Hepworth, Guildford, England

[73] Assignee: Plas Plugs Limited, England

[21] Appl. No.: 859,366

[22] PCT Filed: Nov. 23, 1990

[86] PCT No.: PCT/GB90/01807

§ 371 Date: Jun. 23, 1992

§ 102(e) Date: Jun. 23, 1992

[87] PCT Pub. No.: WO91/08396

PCT Pub. Date: Jun. 13, 1991

[30] Foreign Application Priority Data

Nov. 24, 1989 [GB] United Kingdom ............... 8926587

[51] Int. Cl.$^5$ ..................... F16B 13/04; F16B 19/00
[52] U.S. Cl. ................................. 411/32; 411/37; 411/42; 411/510; 411/913
[58] Field of Search ............... 411/34, 37, 38, 42, 411/55, 71, 72, 182, 508–510, 913, 32, 33

[56] References Cited

U.S. PATENT DOCUMENTS 3,143,916 9/1964 Rice .
3,213,746 10/1965 Dwyer .
3,343,441 9/1967 Van Buren ..................... 411/37
3,385,156 5/1968 Polos ............................ 411/37
3,651,734 3/1972 McSherry ..................... 411/913 X

FOREIGN PATENT DOCUMENTS 827897 7/1975 Belgium .
2425011 11/1979 France .
2002755 12/1979 United Kingdom .

Primary Examiner—Neill R. Wilson
Attorney, Agent, or Firm—Basile and Hanlon

[57] ABSTRACT

A fixing device includes a sleeve portion and an engagement portion which are spaced apart but which are interconnected by two flexible strut members, each of which includes short and long arms. A screw can be inserted through a central bore in the sleeve portion so that its end engages a bore in the engagement portion to initially hold the engagement portion in a fixed position relative to the sleeve portion and thereby resist flexing movement of the strut members. Upon subsequent tightening of the screw, the sleeve and engagement portions are caused to move together, thereby flexing the strut members outwardly.

13 Claims, 1 Drawing Sheet

FIXING DEVICE FOR A CAVITY WALL

BACKGROUND OF THE INVENTION

This invention relates to a fixing device for a cavity wall, such as a wall faced with plasterboard.

SUMMARY OF THE INVENTION

According to the present invention, such a fixing device comprises a sleeve portion adapted to receive therethrough a screw or similar fixing element, an engagement portion spaced from the sleeve portion and adapted to engage an end portion of the screw, and at least one flexible strut member connecting the engagement portion to the sleeve portion, the arrangement being such that engagement of the screw with the engagement portion holds the latter in a fixed position relative to the sleeve portion and thereby resists flexing movement of the at least one strut member. Conveniently, tightening of the screw causes the engagement portion to move towards the sleeve portion and thereby cause the at least one strut member to flex outwardly of the device.

Preferably, the at least one or each strut member comprises a relatively long arm connected to the engagement portion and a relatively short arm connected to the sleeve portion, such that the point where the arms are joined moves forwardly as well as outwardly of the device as the screw is tightened.

Advantageously, the at least one or each strut member has a finger extending forwardly of the device substantially from the point where the relatively long and short arms are joined together.

Conveniently, the at least one or each strut member is connected to the engagement portion at a position which is spaced from the end of the engagement portion nearest to the sleeve portion.

Desirably, the at least one or each strut member normally extends laterally beyond the sleeve portion but can be flexed so as to be at least substantially flush with the sleeve portion, so as to facilitate entry of the device into a bore in the cavity wall. In this case, the relatively long and short arms can be so dimensioned that, when the at least one or each strut member is thusly flexed, the point where the arms are joined lies adjacent to the end of the engagement portion nearest to the sleeve portion.

Preferably, the end of the engagement portion nearest to the sleeve portion has a bore for receiving the end portion of the screw.

Desirably, the device comprises two such strut members extending respectively in opposite lateral directions from the sleeve and the engagement portions.

Conveniently, the sleeve portion has formations on its outer surface for engaging a side wall of a bore in the cavity wall in which the device is inserted in use.

Advantageously the sleeve portion is radially expandable.

BRIEF DESCRIPTION OF THE DRAWING

The invention will now be further described, by way of example only, with reference to the accompanying drawings, in which.

DESCRIPTION OF THE PREFERRED EMBODIMENT

Figure 1:
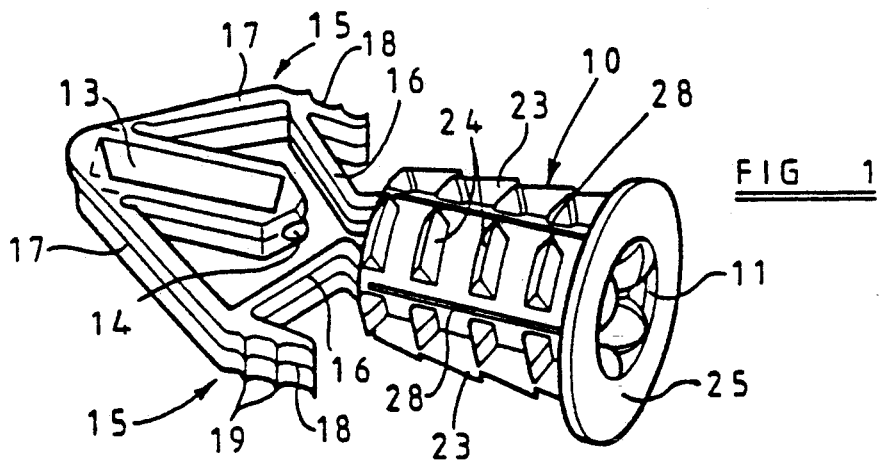
FIG. 1 is a perspective view of the fixing device according to the present invention.
Figure 2:
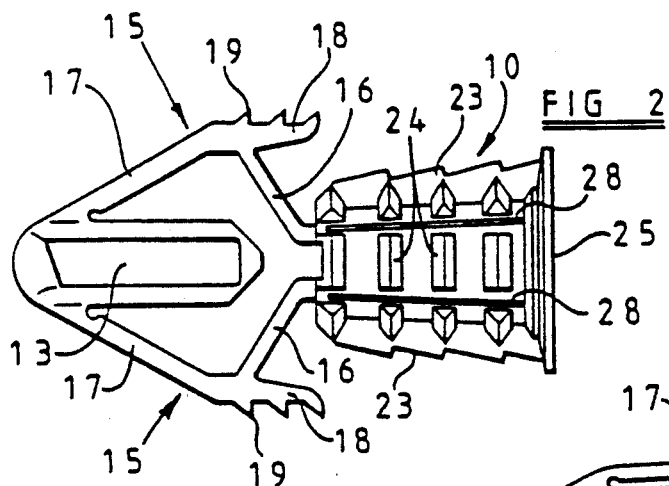
FIG. 2 is a side view showing the device in its normal condition.
Figure 3:
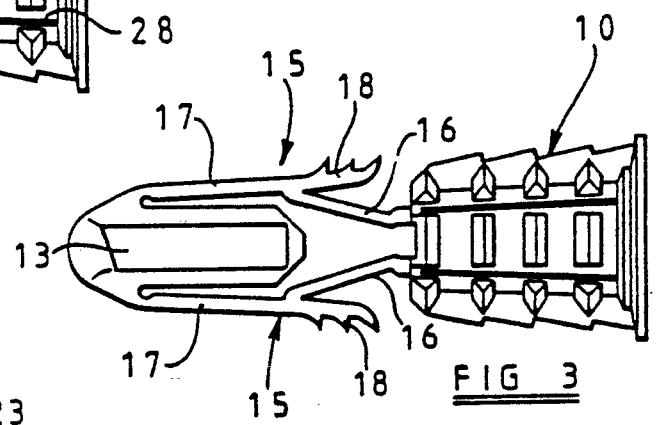
FIG. 3 is a side view showing the device in a condition ready for insertion into a bore in a cavity wall.
Figure 4:
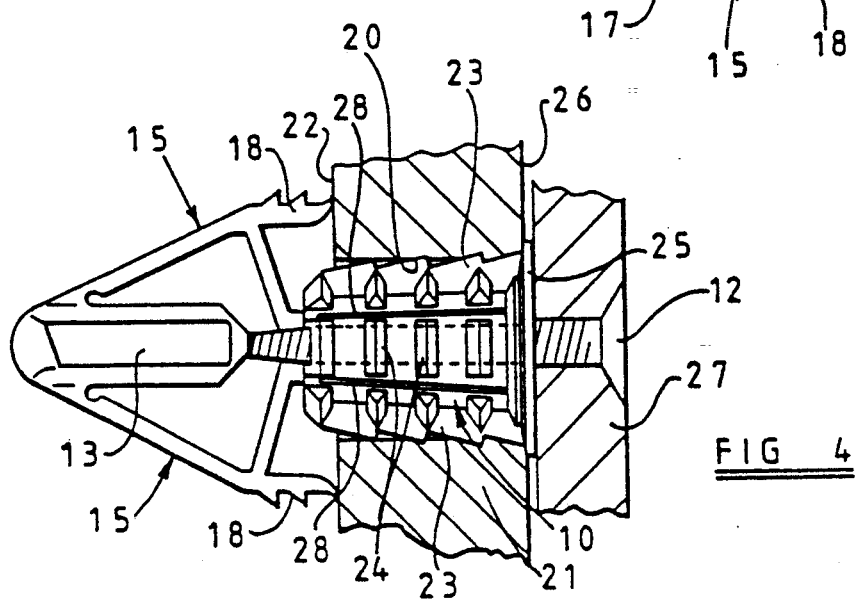
FIG. 4 is a cross sectional side view showing the device in actual use in a cavity wall.

The illustrated fixing device, as shown in FIGS. 1-4, is made of a plastic material and comprises a sleeve portion 10 having a central hole or bore 11 for receiving a screw or similar fixing element 12 (see FIG. 4). The device also comprises an engagement portion 13 which also has a central bore 14 to receive an end portion of the screw, the engagement portion 13 being integrally connected to the sleeve portion 10 by means of a pair of flexible strut members 15 which extend respectively in opposite lateral directions from the portions 10 and 13. Each strut member 15 is composed of a relatively short arm 16 connected to the sleeve portion 10 and a relatively long arm 17 connected to an end of the engagement portion 13 remote from the sleeve portion 10. A finger 18 extends forwardly from the point where the two arms 16, 17 meet in each strut member 15, the outwardly-facing surface of the finger 18 being provided with projections 19.

In order to insert the device into a bore 20 in one leaf 21 (e.g., of plasterboard) of a cavity wall (see FIG. 4), the strut members 15 can be compressed inwardly so that they and the fingers 18 lie substantially flush with the outer surface of the sleeve portion 10, as depicted in FIG. 3. The various parts of the device are so dimensioned that, under this condition, the points where the arms 16 and 17 are joined together lie closely adjacent to the end of the engagement portion 13 nearest to the sleeve portion 10. The part of the device including the engagement portion 13, the strut members 15 and the fingers 18 can then be passed into the bore 20, whereupon the sleeve portion 10 can also be hammered or pressed home into the bore. Once this has been completed, the strut members 15 expand outwardly under their own natural resilience so that the fingers 18 confront a surface 22 of the wall 21 which faces into the cavity.

To facilitate insertion of the sleeve portion 10 into the bore 20, the outer surface of the portion 10 is slightly tapered so that its diameter increases in a direction away from the engagement portion 13. The outer surface is also provided with various formations which serve to resist subsequent removal of the sleeve portion 10 from the bore 20, namely, longitudinally-extending sawtooth ridges 23 and circumferentially-extending broken ridges 24. The sleeve portion 10 also terminates in a flange 25 which engages an outwardly facing surface 26 of the wall 21 to prevent the device from passing completely through the bore 20.

In order to secure an article 27 (such as a shelf bracket) to the wall 21, the screw 12 is passed through a bore in the article 27 and its end portion is pressed into the bore 11 in the sleeve portion 10 as is conventional practice with fixing devices of this general nature. The screw 12 is then turned, causing the threads thereon to bite into the material of the sleeve portion 10 and the screw 12 to penetrate the bore 11. During such penetration, longitudinal splits 28 in the sleeve portion 10 enable the sleeve portion 10 to expand outwardly to urge the formations 23, 24 into close contact with the side walls of the bore 20.

Upon continued turning of the screw 12, its end portion passes out of the opposite end of the bore 11 and into engagement with the bore 14 in the portion 13. The bore 14 is dimensioned so that the threads on the screw 12 will bite into the material of the portion 13, thereby holding the portion 13 in a fixed position relative to the sleeve portion 10. Under this condition, the strut members 15 and the fingers 18 are similarly held in a fixed position relative to the sleeve portion 10. Further tightening of the screw 12 will tend to move the engagement portion 13 forwardly towards the sleeve portion 10, and the resultant longitudinal compression of the device causes the strut members 15 to flex further outwardly. Because of the geometry of the arms 16 and 17, the fingers 18 are thereby moved not only outwardly of the device but forwardly as well, bringing their forward ends into preferably tight engagement with the wall surface 22.

The fixing device thus provides secure mounting of the article 27 on the wall 21, primarily by virtue of the tight engagement of the sleeve portion 10 within the bore 20, but also due to engagement of the fingers 18 with the wall surface 22. The device is therefore above to support rather heavier loads than many conventional cavity wall fixing devices. In the event that the sleeve portion 10 should fail, the article 27 will still be held in place by the action of the strut members 15 and the fingers 18.

What is claimed is:

1. A fixing device for a cavity wall, comprising:
   a sleeve portion adapted to receive a fixing element therethrough;
   an engagement portion spaced from the sleeve portion and adapted to engage an end portion of the fixing element;
   at least one flexible strut member connecting the engagement portion to the sleeve portion, the at least one flexible strut member comprising a relatively long arm connected to the engagement portion and a relatively short arm connected to the sleeve portion, the relatively long arm and the relatively shot arm being connected together at a point; and
   a finger extending forwardly of the device substantially from the point where the relatively long and short arms are joined together;
   the arrangement being such that engagement of the fixing element with the engagement portion holds the latter in a fixed position relative to the sleeve portion and thereby resists flexing movements of the at least one strut member, and tightening of the fixing element causes the engagement portion to move towards the sleeve portion and thereby causes the at least one strut member to flex outwardly of the device and the point at which the relative long arm and the relatively short arm are joined together to move forwardly as well as outwardly of the device, wherein the sleeve portion is radially expandable.

2. The fixing device as claimed in claim 1, wherein the at least one strut member is connected to the engagement portion at a position which is spaced from the end of the engagement portion nearest to the sleeve portion.

3. The fixing device as claimed in claim 1, wherein the at least one strut member normally extends laterally beyond the sleeve portion but can be flexed so as to be at least substantially flush with the sleeve portion, to facilitate entry of the device into a bore in a cavity wall.

4. The fixing device as claimed in claim 1, wherein the relatively long and short arms are so dimensioned that, when the at least one strut member is flexed, the point where the arms are joined lies adjacent to the end of the engagement portion nearest to the sleeve portion.

5. The fixing device as claimed in claim 1, wherein the end of the engagement portion nearest to the sleeve portion has a bore for receiving the end portion of the fixing element.

6. The fixing device as claimed in claim 1, comprising two such strut members extending respectively in opposite lateral directions from the sleeve and engagement portions.

7. The fixing device as claimed in claim 1, wherein the sleeve portion has formations on its outer surface for engaging a side wall of a bore in a cavity wall in which the device is inserted in use.

8. A fixing device for a cavity wall, comprising;
   a sleeve portion adapted to receive a fixing element therethrough;
   an engagement portion spaced from the sleeve portion and adapted to engage an end portion of the fixing element;
   at least one flexible strut member connecting the engagement portion to the sleeve portion, the at least one flexible strut member comprising a relatively long arm connected to the engagement portion and a relatively short arm connected to the sleeve portion, the relatively long arm and the relatively short arm being connected together at a point; and
   a finger extending forwardly of the device substantially from the point where the relatively long and short arms are joined together;
   the arrangement being such that engagement of the fixing element with the engagement portion holds the latter in a fixed position relative to the sleeve portion and thereby resists flexing movements of the at least one strut member, and tightening of the fixing element causes the engagement portion to move towards the sleeve portion and thereby causes the at least one strut member to flex outwardly of the device and the point at which the relative long arm and the relatively short arm are joined together to move forwardly as well as outwardly of the device, and wherein the sleeve portion has formations on its outer surface for engaging a side wall of a bore in a cavity wall in which the device is inserted in use.

9. The fixing device as claimed in claim 8, wherein the at least one strut member is connected to the engagement portion at a position which is spaced from the end of the engagement portion nearest to the sleeve portion.

10. The fixing device as claimed in claim 8, wherein the at least one strut member normally extends laterally beyond the sleeve portion but can be flexed so as to be at least substantially flush with the sleeve portion, to facilitate entry of the device into a bore in a cavity wall.

11. The fixing device as claimed in claim 8, wherein the relatively long and short arms are so dimensioned that, when the at least one strut member is flexed, the point where the arms are joined lies adjacent to the end of the engagement portion nearest to the sleeve portion.

12. The fixing device as claimed in claim 8, wherein the end of the engagement portion nearest to the sleeve portion has a bore for receiving the end portion of the fixing element.

13. The fixing device as claimed in claim 8, comprising two such strut members extending respectively in opposite lateral directions from the sleeve and engagement portions.

* * * * *